INVENTORS.
BRUCE MYERS
FRANK TRESCA
BY Jones & Roe
ATTORNEYS.

June 16, 1942.   B. MYERS ET AL   2,286,434
FILTER
Filed Nov. 14, 1939   2 Sheets-Sheet 2

INVENTORS.
BRUCE MYERS
FRANK TRESCA
BY Jones & Roe
ATTORNEYS.

Patented June 16, 1942

2,286,434

UNITED STATES PATENT OFFICE 2,286,434

FILTER

Bruce Myers and Frank Tresca, Brooklyn, N. Y.

Application November 14, 1939, Serial No. 304,290

8 Claims. (Cl. 210—138)

This invention relates to improvements in filters for use with lubricating systems of internal combustion engines.

Heretofore, filters of this type have been characterized by comparatively complicated structure, necessitating such an expense in manufacture that provision of a filter with stock automotive vehicles has been the exception rather than the rule—in fact, few if any, cars or trucks of the lower price ranges are stock-equipped, and the buyer finds this item almost invariably among the list of "extras" or optional "added equipment."

Manifestly, it is advantageous to provide for the removal of impurities, sludge and other foreign matter from the crank-case oil of motors. But the prudent car owner who desires the installation of a filter is compelled to pay a substantial price. Many cannot afford either the initial installation or repeated renewals after every eight thousand miles or so, which renewals, in addition to the intrinsic value of the devices entail a loss of oil which must be replenished.

We have devised a filter in which simplicity of design, economy of manufacture and extreme efficiency in performance are paramount. The invention can be made at a price within the reach of every pocketbook. It constitutes an outstanding advance in oil filter construction and operates under a principle not, as far as we can determine, heretofore employed.

In a general way, our invention is predicated upon an inversion of the principle of the standard filter wherein oil is forced through a filter unit and then into a central perforated or reticulated tube which must be fortified in some way against clogging. The present invention obviates the necessity for the employment of this special means, and simultaneously reduces structural details to a minimum, thus making for extreme economy without sacrificing efficiency.

Other advantages will appear from the following explication taken in conjunction with the accompanying drawings, which illustrate one form of the invention, and in which.

Figure 1:
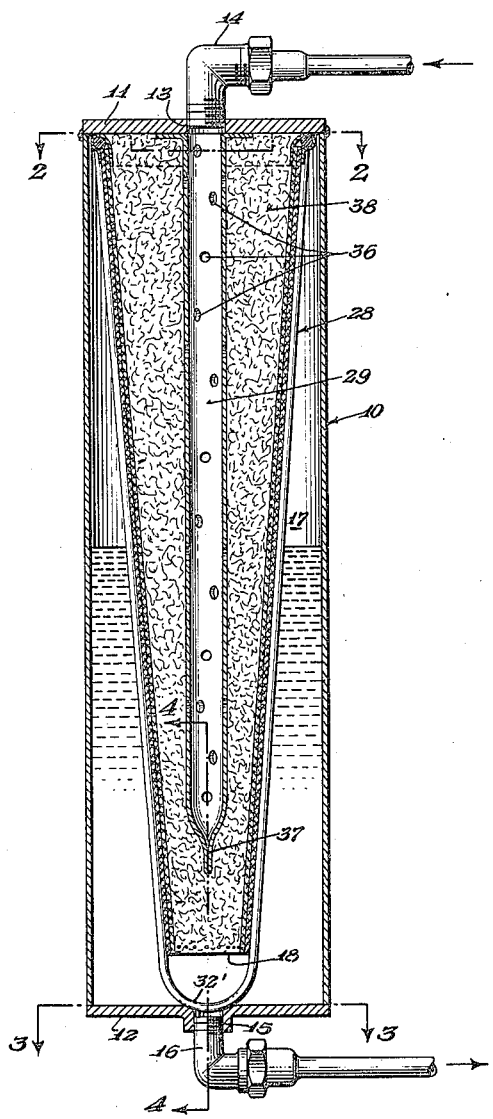
Fig. 1 is a vertical sectional elevation of the filter.
Figure 2:
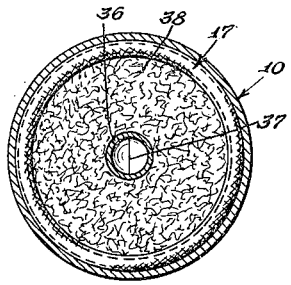
Fig. 2 is a transverse section taken along lines 2—2 of Fig. 1.
Figure 3:
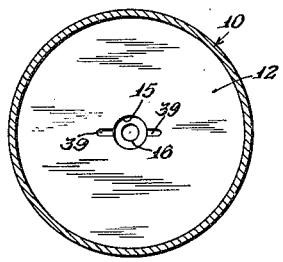
Fig. 3 is a similar view taken along lines 3—3 of Fig. 1.
Figure 4:
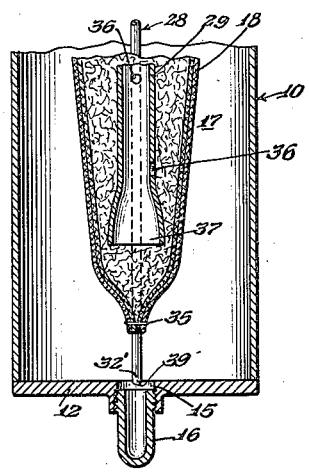
Fig. 4 is a fragmentary section of the lower portion of the assembly, taken along lines 4—4 of Fig. 1.

Referring specifically to the drawings, 10 designates a casing, preferably cylindrical, and having top and bottom closures, respectively, 11 and 12. Top closure 11 is provided with an inlet opening 13 to which is connected an elbow 14; while bottom 12 has an outlet 15 and an elbow 16. Any suitable means, as a bracket, may be utilized for mounting the casing in proper relation to a motor.

Essentially, the filter unit 17 consists of a sack or envelope 18, formed of one or more plys of fabric—two are illustrated in Figs. 6 to 11 of the drawings and bear reference characters 19, 20. Further, the fabric, which may be of a relatively heavy canvas or other closely woven material, comprises two companion blanks 21, 22, having a V-shaped pattern and stitched together along their opposite longitudinal edges at 22' to present a quasi cornucopia with parallel diametrical free marginal extensions 23, 24. At the upper inner wall of the sack an apron of lighter fabric 25 is sewn, as at 26—this is split at 27, and protrudes outwardly in the nature of an appendage—see Fig. 7.

Other elements of the filter unit include a frame 28, a header tube 29 and an initial filter media.

Figure 5:
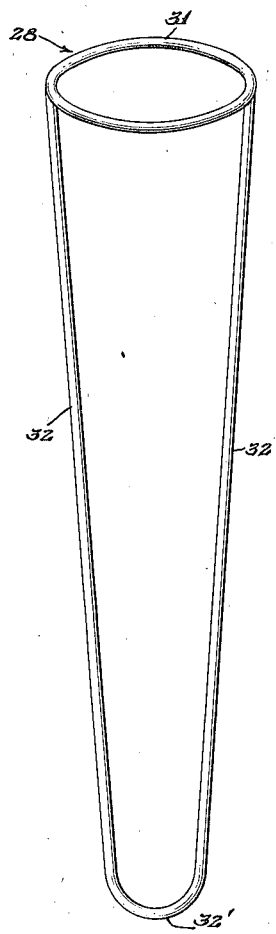
Fig. 5 is a detail perspective view of the wire frame of the filtering unit.
Figure 6:
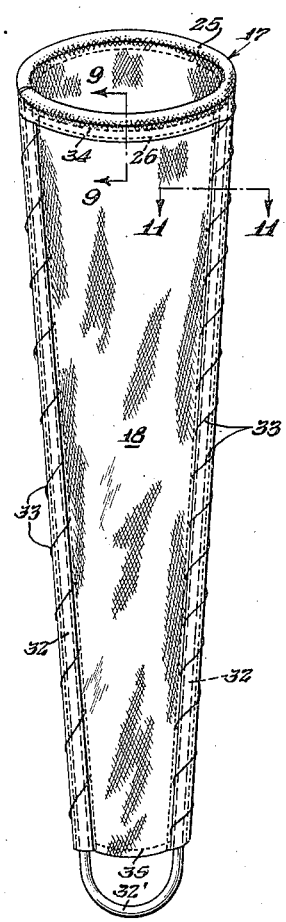
Fig. 6 is a perspective of the filter sack in its entirety.
Figure 7:
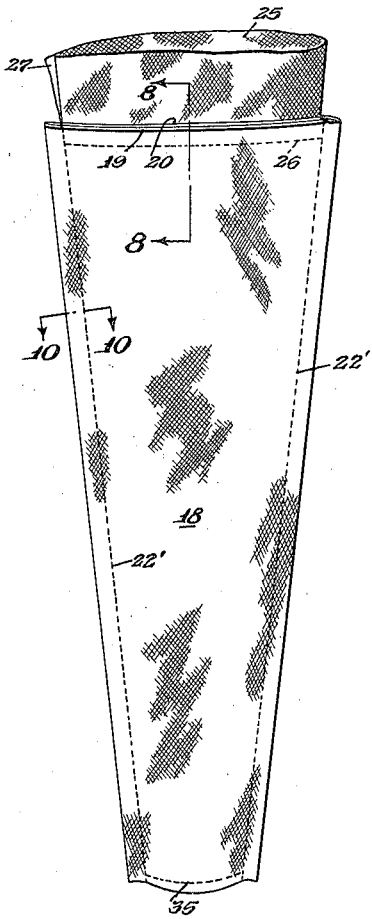
Fig. 7 is a similar view of the sack removed from the frame.
Figures 8, 9:
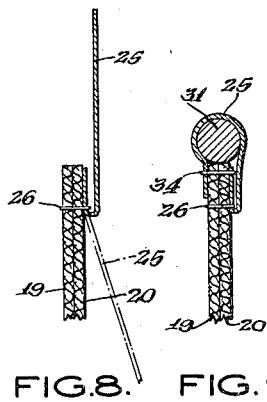
Fig. 8 is a fragmentary sectional elevation of the upper portion of the sack and the apron which is used to attach the sack to the head of the frame, taken along lines 8—8 of Fig. 7.
Fig. 9 is a similar elevation illustrating the apron attached and taken along lines 9—9 of Fig. 6.
Figure 10:
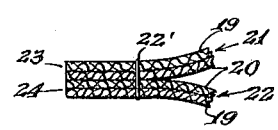
Fig. 10 is a transverse section along lines 10—10 of Fig. 7.
Figure 11:
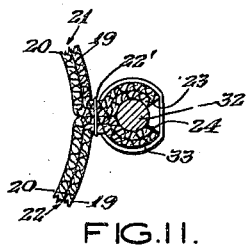
Fig. 11 is a like view taken along lines 11—11 of Fig. 6.

As best seen in Figs. 1, 5 and 6, frame 28 may be conveniently constructed from wire of suitable gauge with an annular top 31 and an integral V-shaped depending shank 32 with a curved lower terminal 32'. The shank is designed to be inserted between the free marginal edges 23, 24 of sack 18 and stitched thereto in any reliable manner, as by the spirally wound thread 33. Top 31, in turn, serves as a support for apron 25 which as will be noted in Figs. 6, 8 and 9 is trained over the ring and secured at 34—such assembly being expedited by reason of the split 27. The bottom of the bag is closed by stitching 35.

Connected with inlet 13 and constituting a virtual continuation thereof, is header tube 29. It projects internally of the sack to a point adjacent the bottom, and is provided with perforations 36 and a pinched closed terminal 37. Any other type of header suitable for the purpose may be employed.

Between the inner and bottom walls of the sack and the outer wall of the header tube is a filling of particle waste 38 which functions as the initial filtering media.

In assembling our invention, the complete filter unit 17 is inserted in casing 10 with the lower terminal 32' of shank 32 seated in the arcuate recess 39 formed in the inner side of the bottom 12. Top 11 is then spot-welded to the upper edge of the casing, with the result that the filter unit is thoroughly anchored within the casing against displacement, either vertically or horizontally. Subsequently, the device is conveniently positioned with respect to the motor, and appropriate connections therewith are established.

As the oil enters inlet 13 and header 29 under pressure, it is forced out through perforations 36, then through waste 38, the finer interstices of sack 18, and then down the outer walls of said sack and finally out through outlet 15, thereby eliminating all impurities, sludge and the like, and insuring a constant circulation of clean lubricant. Due to the fact that the flow of oil is from header 29 outwardly through the filtering medias, the possibility of occluding the perforations 36 is slight—a capital advantage over devices wherein the flow must proceed firstly through a filter element of finely comminuted substance and then through a foraminous outlet with a resultant speedy clogging of the openings of the outlet. Also of the utmost importance is the extreme simplicity of the invention in its entirety, thus enabling the device to be manufactured and installed generally at very low cost, in fact, at a price even below the price of "refills" used in some filters now on the market.

We claim:

1. A filter comprising a casing having a top provided with an inlet and a bottom provided with an outlet, a frame disposed between the top and bottom and including a ring with a pair of depending diametrically arranged side members, and flexible filtering media open at the top and closed at the bottom, with the top thereof secured to the ring, and having portions intermediate the top and bottom partially encircling and stitched to the members.

2. A filter comprising a casing having a top provided with an inlet and a bottom provided with an outlet, a frame disposed between the top and bottom, and including a ring with a pair of depending diametrically arranged side members, and flexible filtering media consisting of a pair of companion blanks having their upper edges secured to said ring, the blanks being joined together at their longitudinal and bottom transverse edges so as to leave free longitudinally extending margins which encircle, and are secured to, the members.

3. A filter comprising a casing having a top and a bottom, the top fitted with an inlet, the bottom provided with a recess and an outlet, a frame in the casing having a ring-like top and a substantially U-shaped integral member connected to and depending convergingly from the top, said member having a curved lower end, a bag-shaped filtering media carried by the frame open at the top and closed at the bottom having its top secured to the said top of the frame, and its bottom terminating short of the lower end of the frame, said media being disposed between the inlet and the outlet, said lower end of the frame engaging the walls of the recess and a perforated header tube arranged axially of the frame and connected with the inlet.

4. A filter comprising a casing having a top and a bottom, the top fitted with an inlet, the bottom provided with a recess and an outlet, a frame in the casing including a ring-like top and a substantially U-shaped integral member having its upper ends connected to diametrically opposite ends of said ring, said member having a curved lower terminal, a bag-shaped filtering media open at the top and closed at the bottom carried by the frame having its top secured to the said top of the frame and its bottom terminating short of said lower terminal, said media disposed between the inlet and the outlet, said lower terminal engaging the recess, and a perforated header tube arranged axially of the frame and connected with the inlet.

5. A filter comprising a casing having a top and a bottom, the top equipped with an inlet and the bottom devised with an outlet having an intersecting recess, a frame consisting of a ring-like top and a substantially U-shaped integral shank affixed at its upper ends to said top and having a curved lower terminal, a bag-shaped filtering media open at the top and closed at the bottom secured to the frame, having its top secured to the said top of the frame and disposed between the inlet and the outlet, said lower terminal engaging the walls of the recess, and a perforated header tube connected with the inlet and disposed within the filtering media and axially of the frame.

6. A filter comprising a frame with a ring-like top and depending diametrically opposed shanks, a fabric sack secured to and between the shanks, and an appendage fabric carried inside the mouth of the sack and extending outwardly therefrom and around said top, with its outer edge secured to the top edge of the sack.

7. A filter including a filter sack and a frame having a ring-like top and a substantially U-shaped depending shank affixed at its upper ends to said top, the filter sack comprising a pair of companion fabric stitched together at points removed inwardly and equidistantly from their opposite longitudinal edges to provide two pairs of separable attached margins attached to said depending shank, and also being stitched at their bottoms, and a third fabric carried by the open end of the sack attached to the top of the frame.

8. A filter including a filter sack and a frame having a ring-like top and a substantially U-shaped depending shank affixed at its upper ends to said top, the filter sack comprising a pair of companion fabrics of relatively heavy texture stitched together at points removed inwardly and equidistantly from their opposite longitudinal edges to leave two pairs of separable attaching margins affixed to said depending shank, and also being stitched at their bottoms, and a third lighter fabric carried by the open end of the sack attached to said ring-like top of the frame.

BRUCE MYERS.
FRANK TRESCA.